Aug. 14, 1934.　　　H. M. FENATI　　　1,970,003
INTERNAL COMBUSTION ROTARY ENGINE
Filed March 21, 1933　　　3 Sheets-Sheet 2
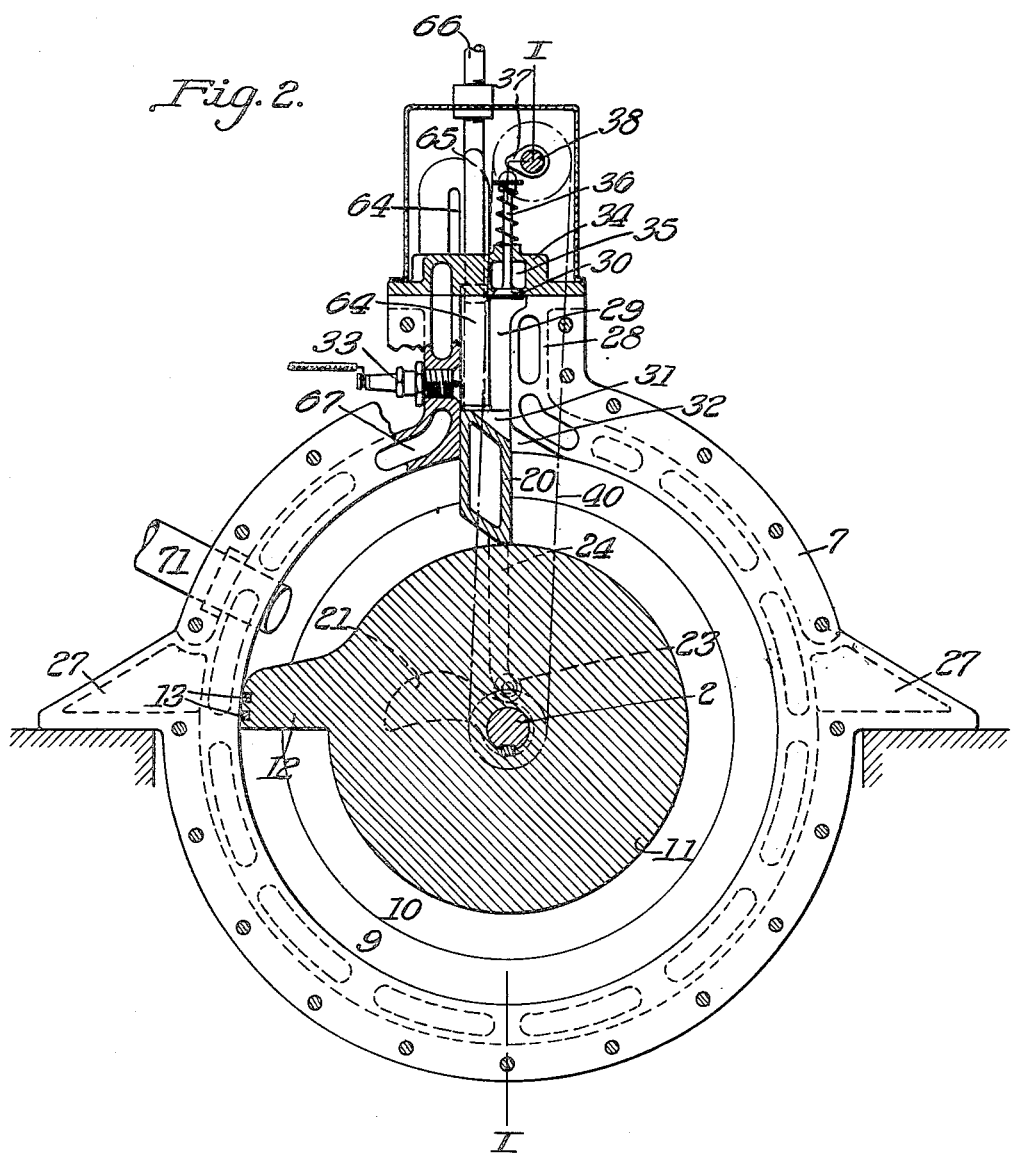

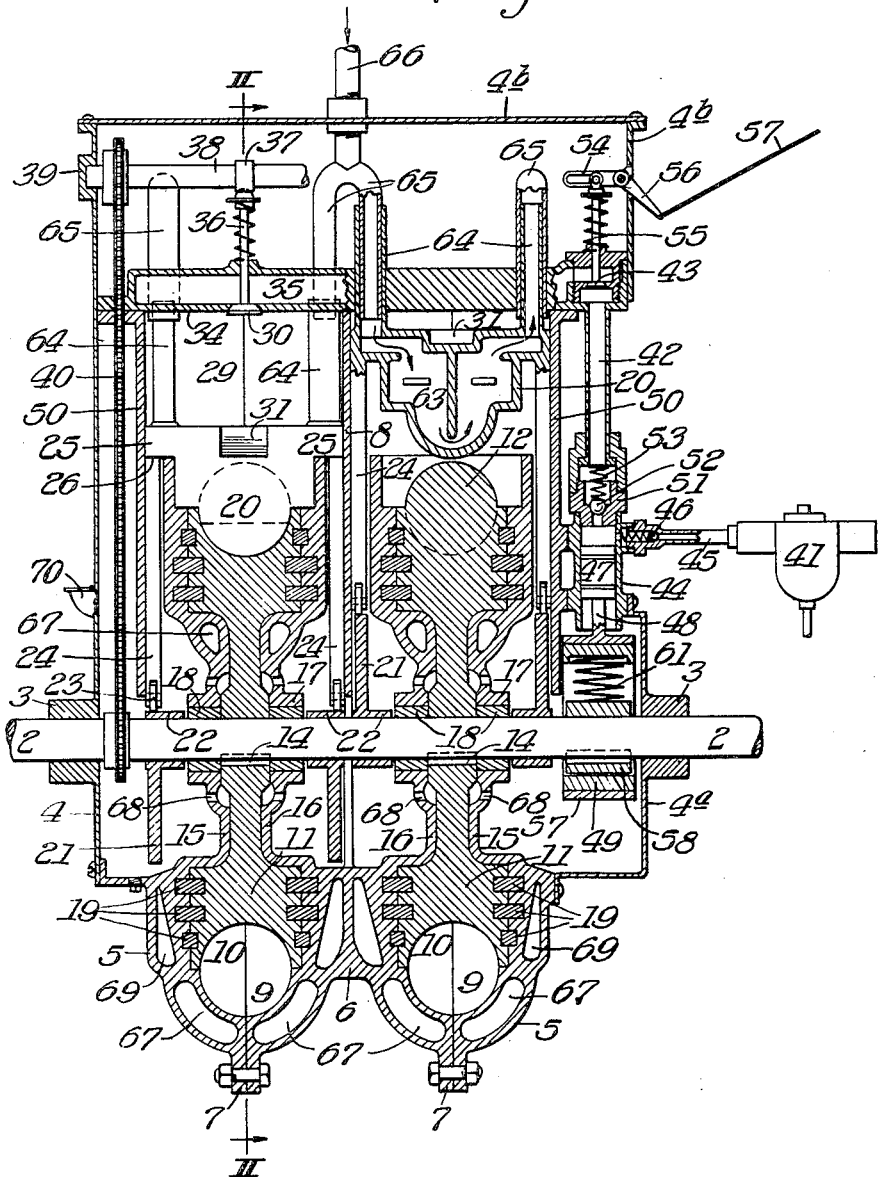

Aug. 14, 1934.    H. M. FENATI    1,970,003
INTERNAL COMBUSTION ROTARY ENGINE
Filed March 21, 1933    3 Sheets-Sheet 3
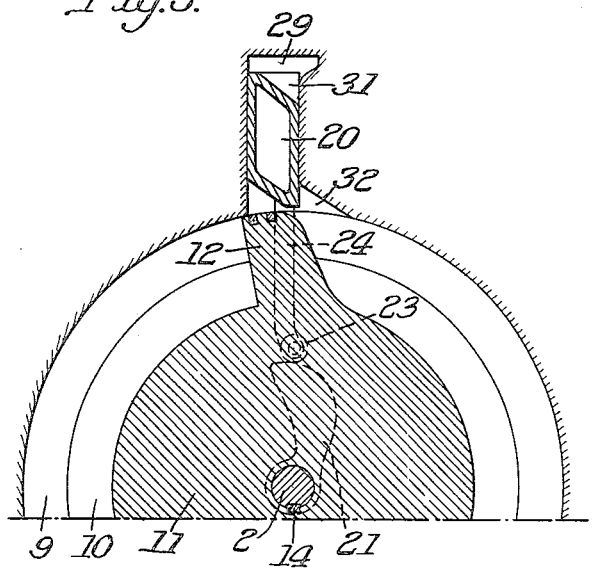
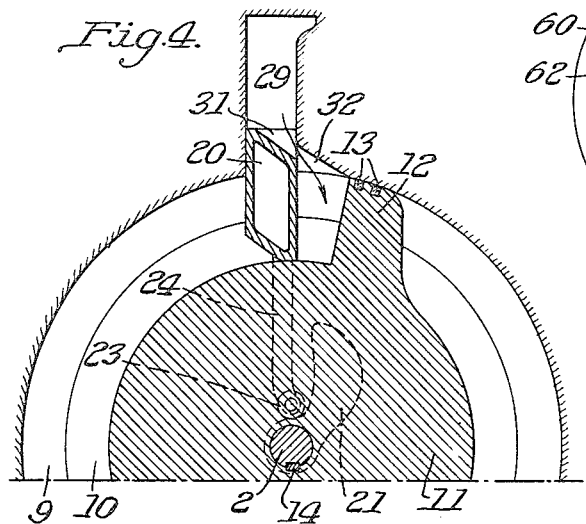
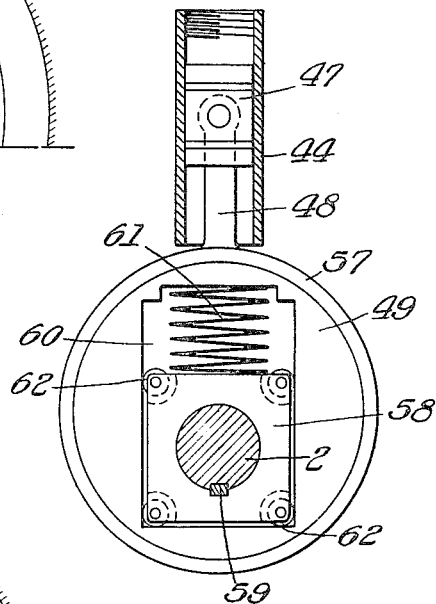
INVENTOR.
Humbert M. Fenati
BY
ATTORNEY.

Patented Aug. 14, 1934

1,970,003

UNITED STATES PATENT OFFICE 1,970,003

INTERNAL COMBUSTION ROTARY ENGINE

Humbert M. Fenati, New Castle, Pa.

Application March 21, 1933, Serial No. 661,899

9 Claims. (Cl. 123—14)

My invention consists of improvements in rotary engines of the internal combustion type, in which a gaseous mixture is introduced to an explosion chamber communicating with an annular piston chamber for action between an adjustable resisting abutment valve and the impelling piston abutment of a rotor, mounted on the main drive shaft.

The invention provides between the rotor and its surrounding casing an annular channel, circular in cross section, one half of such channel consisting of the surrounding semi-circular stationary casing cavity, the other half being formed by the annularly grooved rim of the rotor. The piston abutment moves around through the semi-circular annular channel of the casing under expansive action of the exploded gases, which are exhausted to the atmosphere just prior to opening and closing of the resisting abutment-valve, in a two cycle operation.

The resisting abutment-valve and its actuating mechanism, the means for supplying fuel under compression, the inlet and outlet valve mechanism, the cooling and lubricating features, and various other novel elements of the invention contribute to the efficiency and value of the engine as a whole, as shall be more fully hereinafter described.

Referring to the drawings showing one preferred embodiment of the invention:

Fig. 1 is a vertical sectional view of a double sided engine on the line I—I of Fig. 2, showing at one side the controlling abutment-valve and cooling connections therefor also in section;

Fig. 2 is a similar section on the line II—II of Fig. 1;

Figs. 3 and 4 are partial sectional views, similar to Fig. 2, showing the controlling abutment-valve in raised and lowered positions respectively relative to the rotor abutment;

Fig. 5 is an enlarged view in sectional elevation of the explosive mixture compressor and its actuating eccentric.

While the engine may be of single casing and rotor construction, it is preferably illustrated as of double form, for economical construction, increase of power, balanced torque, ease in starting, and other advantages as will be obvious to those skilled in the art.

In such construction, the main shaft 2 extends transversely through bearings 3 in outer casing walls 4 and 4a at opposite sides of the interior working space.

The main frame of the engine proper consists of outer half sections 5 secured to a middle section 6 by flanges 7 meeting on the transverse division line II—II. The middle section 6 comprises at opposite sides of its middle division wall 8 two half section cylinder members which are completed by the outer sections 5. These meet on the common planes of their bolted together joints, and each section thus contributes one quarter round annular cavity, so that when together each connected pair forms the one half 9 of the annular piston chamber. The other one half of the piston chamber cavity is formed by the half circular cavity 10 in the rim of the rotor 11.

Annular cavity 10 of the rotor is continuous except where interrupted by the piston 12 having the half circular outer portion fitting within the surrounding annular chamber 9, and provided with the resilient part-ring packing members 13.

The hub of rotor 11 is keyed to shaft 2 as at 14, and the entire rotor is embraced between the inner conforming walls 15, 16, of sections 5 and 6 respectively, through the hubs 17 of which the shaft 2 revolubly passes in bearings 18.

The outer peripheral portion of the rotor is preferably enlarged as shown, of ample width to provide stock for the annular channel 10, and annular packing rings 19 are provided for sealing the active gases. These are mounted in annular confronting grooves in the casing and rotor respectively, as shown.

The controlling element of the engine is provided by a reciprocable abutment-valve 20, radially mounted in an extension of the casing, for elevation beyond the piston 12 and insertion behind the abutment-valve, to provide a resisting wall for active exertion of pressure against the piston 12.

The outer wider portion of abutment-valve 20 is slidably mounted by its edges across the annular channel 9 of the casing and its inner portion is of half round form, adapting it when inserted, to extend into and close the rotor channel 10, as shown.

It is important of course to elevate the resisting abutment-valve 20 immediately in front of the advancing piston 12 as in Fig. 3, and to lower it immediately behind the piston to provide a resisting backing for the exploded mixture, as in Fig. 4, with simultaneous introduction of explosive pressure between the abutment-valve and piston.

For such purpose I provide the cams 21 suitably secured by their hubs 22 to shaft 2 engaging rollers 23 of oppositely arranged extensions 24 secured to or integral with the upper lateral portions 25 of the valve, as at 26.

As shown in Fig. 2, sections 5 and 6 are provided at opposite sides with supporting foundation brackets 27 and at their upper middle portions with housing extensions 28.

Between these extensions is provided the explosion chamber 29 having inner vertical walls for sliding movement of abutment-valve 20 as it is raised by the cams 21 and lowered by internal pressure of the explosive mixture, upon opening of abutment-valve 30.

Abutment-valve 20 is provided with an inclined slotted port 31 adapted to register with a receiving channel 32 leading into annular piston chamber 9—10 when the abutment-valve is lowered, and the charge is ignited at the proper time by spark plug 33.

Valve 30 is mounted in the head 34 and controls admission of the mixture from manifold or conduit 35 when spring-retracted stem 36 is lowered by the properly timed finger or cam 37 of shaft 38. Shaft 38 is mounted in bearings 39 of casings 4 and is rotated in any suitable manner, as by sprocket chain 40 from shaft 2. Fuel gas is introduced to manifold 35 from a suitable mixing device, as carburetor 41, by means of a forced feed conduit 42.

Such conduit leads into one end of the manifold which is preferably provided with a regulating throttling valve 43, and communicates at its other end with a plunger chamber or cylinder 44, also connected as by intake connection 45, preferably provided with a check-valve 46, with the carburetor 41.

A plunger or piston 47 is reciprocably mounted in cylinder 44 and actuated through connecting rod 48, or other suitable means, with an actuating element as a cam or eccentric 49 mounted around shaft 2. Outer side walls 50 are incorporated with the sections 5 and the manifold 35 with lower clearance space around and below the shaft 2, for ample lubricant circulation.

Outer walls 50 and middle wall 8 are provided with vertically arranged bearings for the extensions 24, maintaining them in operative relation to cams 21. Cylinder 44 is mounted on one side wall 50 and is also connected with the short side wall 4a as shown, and communicates with conduit 42 by a ported cage 51 having a check-valve 52. The upper portion of the engine equipment is covered by a supplemental casing 4b.

By such construction, on downward movement of plunger 47 check-valve 52 is seated and check-valve 46 opens by suction of the plunger to admit mixture from the carburetor. On upward movement of the plunger, check-valve 46 closes such flow and valve 52 opens to admit the mixture to the manifold. Check-valve 52 is held to its seat under pressure of a spring 53 of sufficient strength to permit sufficient compression by the plunger before the mixture charge passes to the manifold.

Throttling valve 43 is capable of being accurately opened to the desired degree by a spring-retracted lever 54 engaging the valve stem 55 and actuated by arm 56 and operating connection 57.

Eccentric 49 is provided with a ring or strap 57 with which pitman 48 is connected, and the eccentric is mounted on shaft 2 for variable movement, dependent on the re-action of the compressed mixture. For such purpose a rectangular block 58 is secured to shaft 2, as by key 59 or other suitable means, and eccentric 49 is provided with an elongated opening 60, and a spring 61 between its outer end and block 58.

The block is preferably provided with rollers 62 at its corners engaging the inner parallel walls of the opening 60, facilitating movement of the eccentric towards and from the center of shaft 2. By such means the maximum content of mixture is delivered under full load, or a less proportion as desired, under control of the throttle valve 43 and the check-valve 52.

By such construction the desired amount of explosive mixture is withdrawn from the carburetor on downward movement of the plunger 47, and is then supplied under pressure through conduit 42 to the manifold. Thus, upon lowering of one or the other valve 30, a suitable amount of explosive mixture will be introduced to explosion chamber 29 for use as provided by the circulating pressure resisting abutment-valve 20 when lowered.

Abutment-valve 20 as shown is hollow for interior water circulation, as at 63, whereby the abutment-valve is constantly cooled under the heating effect of the successive explosions. For such purpose it is provided at opposite sides with tubular extensions 64 in telescoping engagement with upper similar conduits 65, in communication with a supply source of cooling water, as by an intake pipe 66. By such means water is introduced to one or both valves through one of the telescoping connections 65—64, and after circulation through the valve is discharged outwardly through the other pair of similar telescoping conduits.

The main engine casing sections 5—6 are also cooled by water circulation through the core openings 67, as is common practice, formed in the body portion of the walls and communicating with suitable inlet and exhaust connections, whereby to maintain a cooling current throughout the walls during operation.

For such purpose the discharge from the valves may be connected directly to the core openings of the casing, or the latter may have an independent supply, as preferred.

For the purpose of providing lubrication for the working parts, the inner hollow or open portions of the engine between the middle partition 8 and the outer wall or walls 4 is filled with a suitable lubricant, as oil, to any desired level above shaft 2, and walls 15 and 16 are provided with circulating ports 68 for access to the adjacent faces of the rotor in its revolution within such closely fitting walls.

Walls 5 and 6 may also be provided, if desired, with similar water circulating core openings 69, and lubricant may be supplied to the interior by the receiving conduit 70.

As shown in the several figures, cams 21 operate to elevate the abutment-valve 20 at the proper time to lift it above the approaching piston 12, the abutment-valve being immediately lowered upon release of the cams, by pressure of the mixture, so as to locate it immediately behind the piston 12, as in Fig. 4.

Thereupon, ignition occurs and the exploded gases act against the rear end of the piston, which continues under such pressure until arriving approximately at the position of Fig. 2, whereupon the exploded gases escape through conduit 71.

By reason of the construction of the rotor 11, provided with the semi-circular annular groove 10, except where interrupted by abutment-valve 20, the corresponding semi-circular projecting portion of the abutment-valve when lowered is snugly seated, making substantially close contact with the annular groove. By such construction the full efficiency of the explosive mixture is utilized for the entire portion of the revolution, excepting the fractional portion thereof during which the abutment-valve is raised and lowered for passage of the piston.

By making the engine in double unit construction as shown, the rotors may be so positioned as to locate the piston 12 of one in advance of the other, thereby ensuring initial operation of one of the units in starting.

The engine as a whole is extremely compact and self-contained, provided with proper and sufficient compacting, lubricating, and cooling efficiency. By reason of its construction, the several main sections of the frame are brought together on their meeting planes and are closely connected together, either with or without gaskets, and the engine as a unit is capable of being suitably mounted in constricted locations for application of power directly to any utilizing element or mechanism.

The construction and operation of the invention as a whole will be readily understood and appreciated from the foregoing description. It may of course be built in various sizes and capacities, and in one, two, or more units, by the designing engineer to adapt it to various applications of service, or may be otherwise changed or varied in different details of construction, but all such changes are to be understood as within the scope of the following claims.

What I claim is:

1. In an internal combustion rotary engine, the combination with a casing having an annular half round piston chamber and a rotor therein having an annular half round co-operating channel and a radial piston extending into and closing the casing chamber, a radially extending abutment-valve housing provided with a valve-receiving explosive mixture chamber having an ignition device, means furnishing a compressed explosive mixture thereto, and a reciprocable hollow abutment-valve slidably mounted in the mixture chamber having telescoping water supply and exhaust connections and provided with a circulating port adapted to admit exploded gases directly from the mixture chamber to the piston chamber when said abutment valve is inserted into the channel.

2. In an internal combustion rotary engine, the combination with a casing having an annular half round piston chamber and a rotor therein having an annular half round co-operating channel and a radial piston extending into and closing the casing chamber, a radially extending abutment-valve housing provided with a valve-receiving explosive mixture chamber having an ignition device and oppositely arranged slideway openings radially beyond the piston chamber, means furnishing a compressed explosive mixture to the chamber, and a reciprocable abutment-valve slidably mounted in the slideways of the mixture chamber having a main body portion insertible across the annular casing portion of the piston chamber, the abutment-valve having slide extensions at each side and an inner narrower half round extension insertible in the half round channel of the rotor.

3. In an internal combustion rotary engine, the combination with a double sided casing having an annular half round cavity forming the outer portion of a piston chamber, a rotor embraced by the casing having an annular half round cavity forming the inner portion of said chamber, a radial piston extending from the rotor across the entire chamber space and traversible through and closing the outer half round cavity, a transverse shaft secured to the rotor, a radially arranged extension of the casing providing an abutment-valve housing cavity, and a valve-receiving explosive mixture chamber having an ignition device, a transverse closing manifold head therefor having an inlet valve for compressed explosive mixture, an abutment-valve slidably mounted in the housing cavity having an inner portion insertible across the full area of the piston chamber, the casing having a clearance opening establishing circulation thereto from the housing cavity when the abutment-valve is inserted, and means for actuating the abutment-valve.

4. In an internal combustion rotary engine, the combination with a double sided casing having an annular half round cavity forming the outer portion of a piston chamber, a rotor embraced by the casing having an annular half round cavity forming the inner portion of said chamber, a radial piston extending from the rotor across the entire chamber space and traversible through and closing the outer half round cavity, a transverse shaft secured to the rotor, a radially arranged extension of the double sided casing providing an abutment-valve housing cavity and a valve-receiving explosive mixture chamber having an ignition device, a transverse closing manifold head therefor having an inlet valve for compressed explosive mixture, an abutment-valve slidably mounted in the housing cavity having an inner portion insertible across the full area of the piston chamber, the abutment-valve and casing having clearance openings establishing circulation thereto from the housing cavity, and means for actuating the abutment-valve.

5. In an internal combustion rotary engine, the combination with a double sided casing having an annular half round cavity forming the outer portion of a piston chamber, a rotor embraced by the casing having an annular half round cavity forming the inner portion of said chamber, a radial piston extending from the rotor across the entire chamber space and traversible through and closing the outer half round cavity, a transverse shaft secured to the rotor, a radially arranged extension of the casing providing an abutment-valve housing cavity, and a valve-receiving explosive mixture chamber having an ignition device, a transverse closing manifold head therefor having an inlet valve for compressed explosive mixture, means furnishing a compressed explosive mixture thereto, a hollow water cooled abutment-valve slidably mounted in the housing cavity having an inner portion insertible across and beyond the full area of the piston chamber and provided with an opening establishing circulation thereto from the housing cavity, and means for actuating the abutment-valve.

6. In an internal combustion rotary engine, the combination with a double sided casing having an annular half round cavity forming the outer portion of a piston chamber, a rotor embraced by the casing having an annular half round cavity forming the inner portion of said chamber, a radial piston extending from the rotor across the entire chamber space and traversible through and closing the outer half round cavity, a transverse shaft secured to the rotor, a radially arranged extension of the casing providing an abutment-valve housing cavity, a transverse closing manifold head therefor having an inlet valve for compressed explosive mixture, an ignition device therefor, a reciprocable hollow abutment-valve slidably mounted in the housing cavity having an inner portion insertible across the full area of the piston chamber and establishing circulation thereto from the housing cavity, telescoping water supply and exhaust connections for the abutment-valve extending through the transverse closing head, and means for actuating the abutment-valve.

7. In an internal combustion rotary engine, the combination with a double sided casing having an annular half round cavity forming the outer portion of a piston chamber, a rotor embraced by the casing having an annular half round cavity forming the inner portion of said chamber, a radial piston extending from the rotor across the entire chamber space and traversible through and closing the outer half round cavity, a transverse shaft secured to the rotor, a radially arranged extension of the casing providing an abutment-valve housing cavity laterally widened at each side beyond its annular half round piston chamber portion and providing a valve-receiving explosive mixture chamber having an ignition device, a transverse closing head for the abutment-valve housing cavity covering the explosive mixture chamber, an abutment-valve slidably mounted in the housing cavity having an inner portion insertible across the full area of the piston chamber and embodying a circulation opening establishing circulation thereto from the housing cavity, and means for actuating the abutment-valve.

8. In an internal combustion rotary engine, the combination with a double sided casing having an annular half round cavity forming the outer portion of a piston chamber, a rotor embraced by the casing having an annular half round cavity forming the inner portion of said chamber, a radial piston extending from the rotor across the entire chamber space and traversible through and closing the outer half round cavity, a transverse shaft secured to the rotor, a radially arranged extension of the casing providing an abutment-valve housing and explosive mixture cavity laterally widened at each side beyond its annular half round piston chamber portion, a transverse closing head for the abutment-valve housing cavity closing the explosive mixture cavity, an ignition device in the mixture cavity, an abutment-valve slidably mounted in the housing cavity having an inner portion insertible across the full area of the piston chamber and establishing circulation thereto from the housing cavity, cams on the rotor shaft, and abutment-valve extensions from its laterally widened portions having terminals engaging the cams.

9. In an internal combustion rotary engine, the combination with a casing having an annular half round piston chamber and a rotor therein having an annular half round co-operating channel, an abutment-valve housing extending radially from the casing provided with a valve-receiving explosive mixture chamber having an ignition device and oppositely arranged slideways, said slideways extending laterally beyond the width of the abutment-valve housing, a transverse closing manifold head having an inlet valve for compressed explosive mixture, means furnishing a compressed explosive mixture to said chamber, and a reciprocable abutment-valve having opposite lateral extensions slidably mounted in said slideways at each side of the mixture chamber and a main middle body portion insertible across the annular casing portion of the piston chamber and an inner narrower half round extension simultaneously insertible in the half round channel of the rotor.

HUMBERT M. FENATI.